April 21, 1931.  W. H. KEENE  1,801,925
HAME LUG BOLT
Filed Aug. 9, 1930
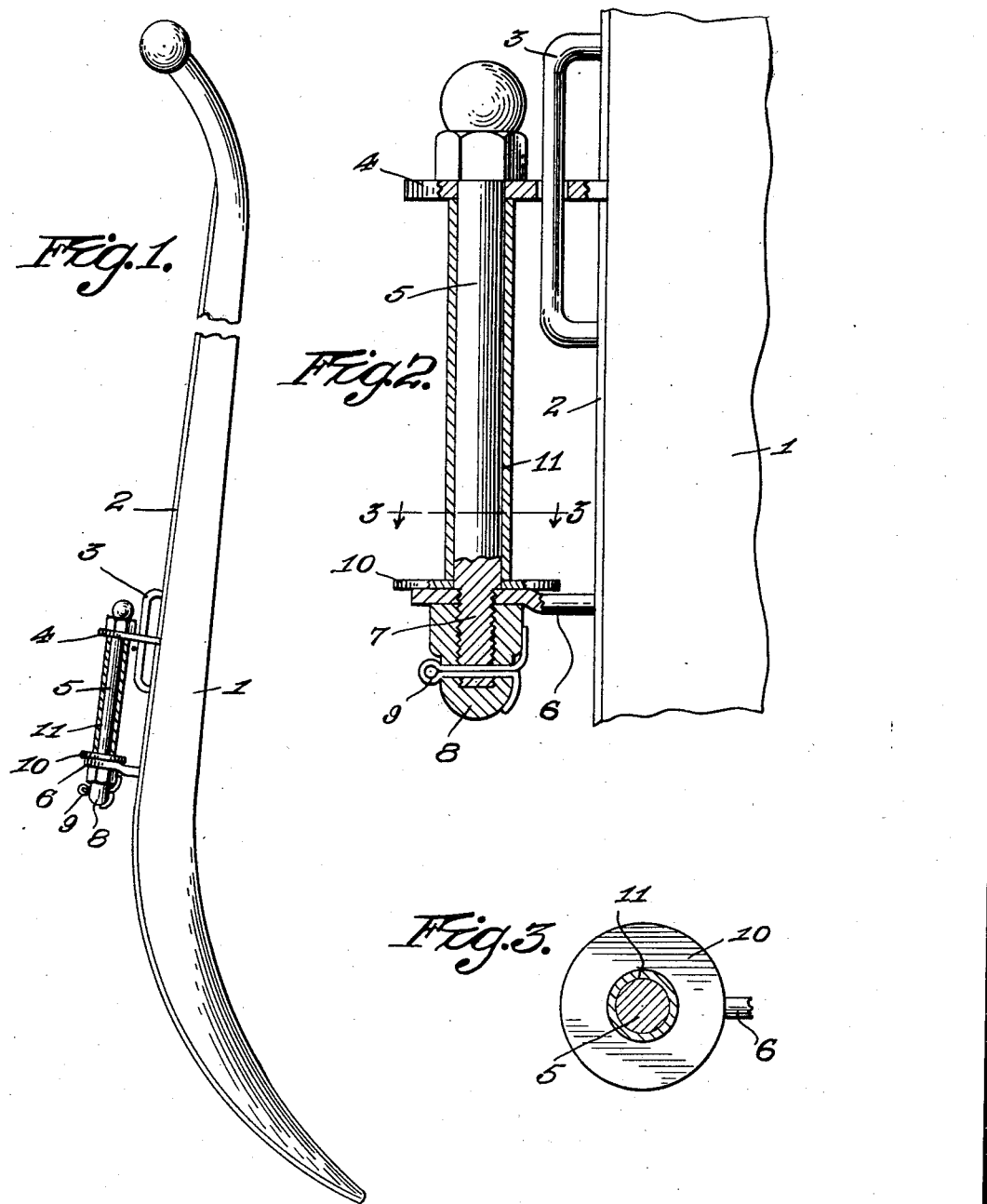
Walter H. Keene,
INVENTOR
BY Victor J. Evans
ATTORNEY Patented Apr. 21, 1931                                    1,801,925

UNITED STATES PATENT OFFICE

WALTER H. KEENE, OF LISBON FALLS, MAINE

HAME LUG BOLT

Application filed August 9, 1930. Serial No. 474,179.

My present invention has reference to a harness hame, and my object is to provide a hame with a long bolt for the lug strap of a double harness which is removably associated with the hame so that the loop or rod may be employed when the hames are used in connection with the lug strap of a single harness.

To the attainment of the foregoing the invention consists in the improvement hereinafter described and definitely claimed.

In the drawings:

Figure 1 is a side elevation illustrating the application of the improvement.

Figure 2 is an enlarged detail side elevation with parts in section.

Figure 3 is a transverse sectional view on the line 3—3 of Figure 1.

The hame 1, disclosed by the drawings is of the usual construction, the same having its outer face shod with a metal strip or plate 2 and being provided with the rod 3 whose inwardly directed or angle ends are secured in the hame and which rod or loop is designed to receive the lug strap of a single hame. This, of course, is of the usual construction. In carrying out my invention I provide a plate 4 apertured to receive the rod 3 therethrough and having its inner end notched to contact with the outer face and edges of the metal strip or plate 2. The plate 4 extends a suitable distance beyond the eye or rod 3 and is provided with an opening for the passage of the shank of a headed bolt 5. At a suitable distance below the element 4 I fix on the outer face of the hame one end of a member 6 of a length approximately equaling that of the plate 4. The member 6 has an opening therethrough in a line with the opening for the shank of the bolt 5 and this opening is preferably threaded and has screwed therein the reduced end 7 of the bolt shank 5. There is screwed on the end 7 of the shank a cap nut 8 and there is passed through alining openings in this cap nut and through the end 7 of the bolt a holding element such as a cotter pin 9.

Resting on the member 6 there is a disc 10 and arranged around the shank of the bolt 5 there is a sleeve 11.

From the foregoing description when read in connection with the accompanying drawing it will be noted that the comparatively wide lug strap of a harness may be readily arranged around the sleeve 11 and bolt 5 and likewise that the bolt 5 may be removed to permit of the plate 4 swinging downwardly on the plate 3 when the said member 3 is to engage the narrow lug strap of a single harness.

Having described the invention, I claim:

A hame having its outer face shod with a metal strip and having a rod provided with angle ends which are inserted through the strip and enter the hame, a plate having an opening receiving the rod therethrough and said plate having its inner end notched to contact with the edges and outer face of the metal strip, said plate, adjacent to its outer end being provided with an opening, a headed bolt having its shank passing through such opening, a member inserted in the hame below the rod and having an opening adjacent to its end which is threaded, the shank of the bolt having a reduced threaded extension which is screwed through the opening, a cap nut screwed on the outer end of the said extension, a removable element passing through the cap nut and bolt extension, a disc resting on the upper face of the member, and a sleeve surrounding the shank of the bolt having its ends in contact with the disc and with the plate.

In testimony whereof I affix my signature.

WALTER H. KEENE.